United States Patent [19]

Coffey

[11] 4,227,854
[45] Oct. 14, 1980

[54] APPARATUS FOR REMOVING HEAT EXCHANGER TUBE BUNDLES

[75] Inventor: William A. Coffey, Middlesbrough, England

[73] Assignee: Imperial Chemical Industries Limited, London, England

[21] Appl. No.: 923,443

[22] Filed: Jul. 10, 1978

[30] Foreign Application Priority Data

Jul. 11, 1977 [GB] United Kingdom ............... 28985/77

[51] Int. Cl.³ .............................................. B66F 1/00
[52] U.S. Cl. ..................................... 414/746; 29/726; 254/111
[58] Field of Search ......................... 29/726, 244, 252; 414/746; 254/108, 111

[56] References Cited

U.S. PATENT DOCUMENTS

| | | | |
|---|---|---|---|
| 2,318,567 | 5/1943 | Duerig | 254/111 |
| 3,567,044 | 3/1971 | Travix | 29/726 X |
| 3,870,279 | 3/1975 | Century | 254/111 X |
| 3,958,698 | 5/1976 | van der Woerd | 214/1 P |
| 4,032,112 | 6/1977 | Schmidt | 254/108 |
| 4,053,062 | 10/1977 | Travis | 29/726 X |

FOREIGN PATENT DOCUMENTS

| | | | |
|---|---|---|---|
| 951564 | 3/1964 | United Kingdom | 29/726 |
| 963243 | 7/1964 | United Kingdom | 29/726 |

OTHER PUBLICATIONS

Hydro-Extractors, Inc. Brochure, 1973.

*Primary Examiner*—Milton S. Mehr
*Attorney, Agent, or Firm*—Cushman, Darby & Cushman

[57] ABSTRACT

Apparatus for moving a tube bundle out of or into a heat exchanger shell consists of an elongated frame structure including a pair of parallel spaced beams, a mobile carriage to support the tube bundle and mounted on the parallel beams for movement along them, clamps to connect and lock the elongated frame structure to the shell of the heat exchanger, a mobile sub-frame carrying a hydraulically-operated force-exerting mechanism to be connected to the tube bundle to move it out of the shell, and laterally positioned stops along the length of the frame structure to provide opposing thrust surfaces to the thrust exerted by the force-exerting mechanism so as to effect movement of the tube bundle along the frame structure.

11 Claims, 11 Drawing Figures

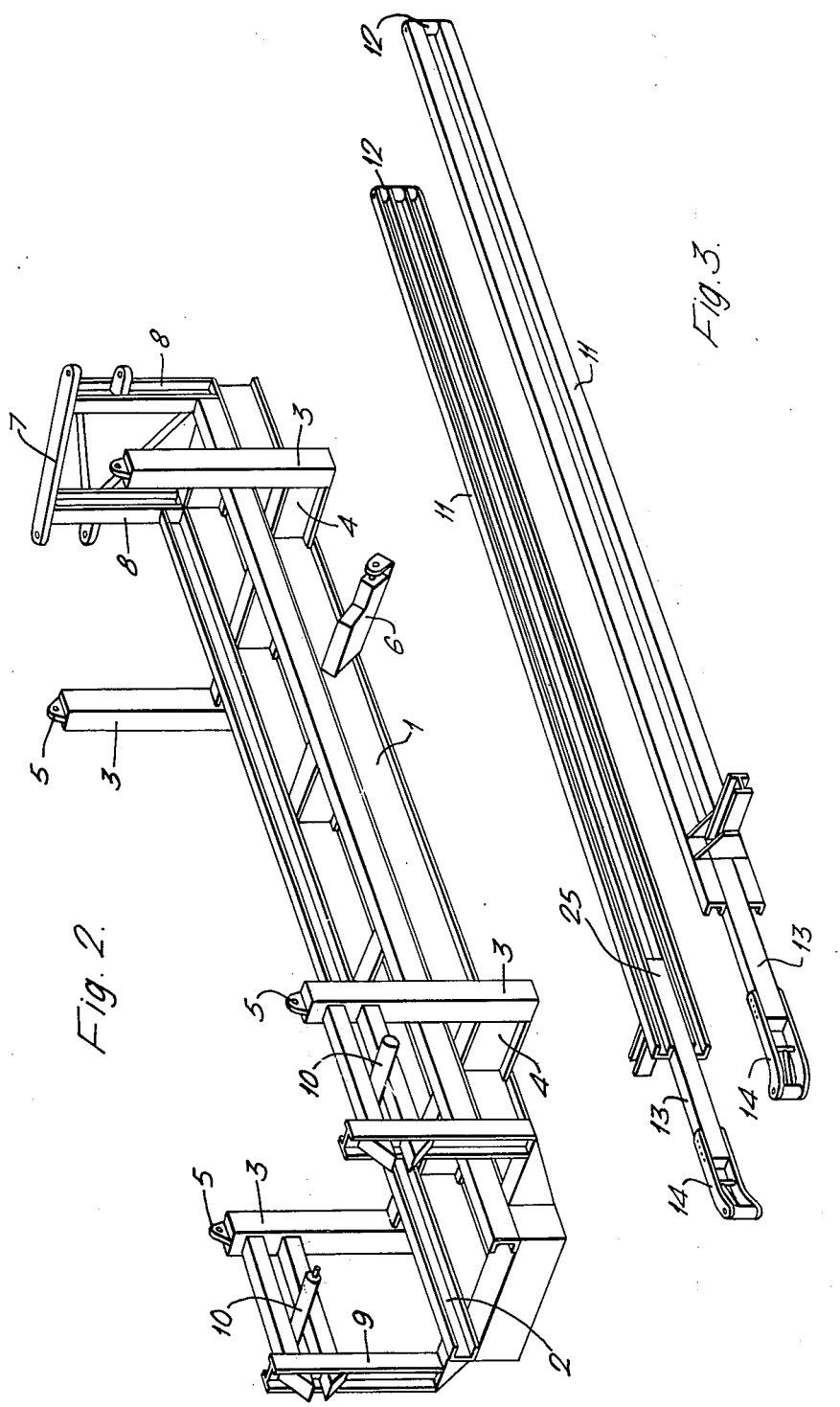

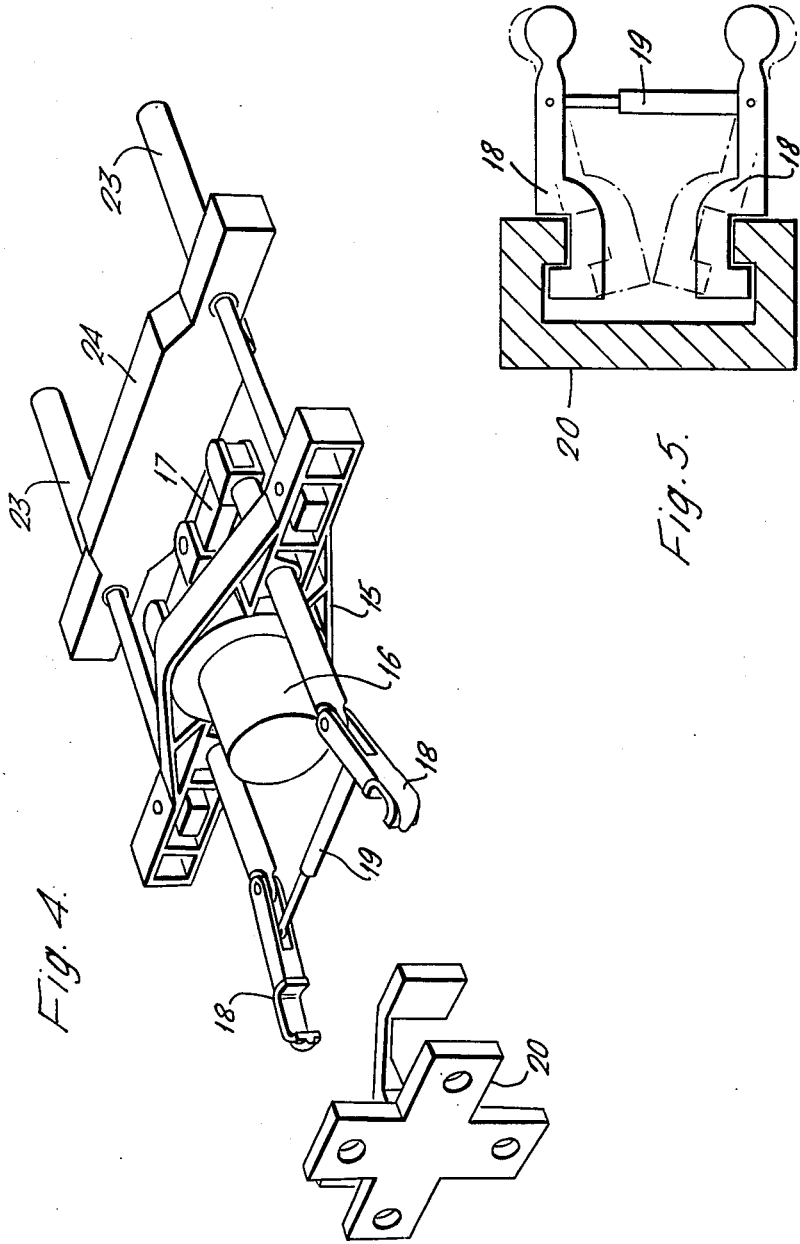

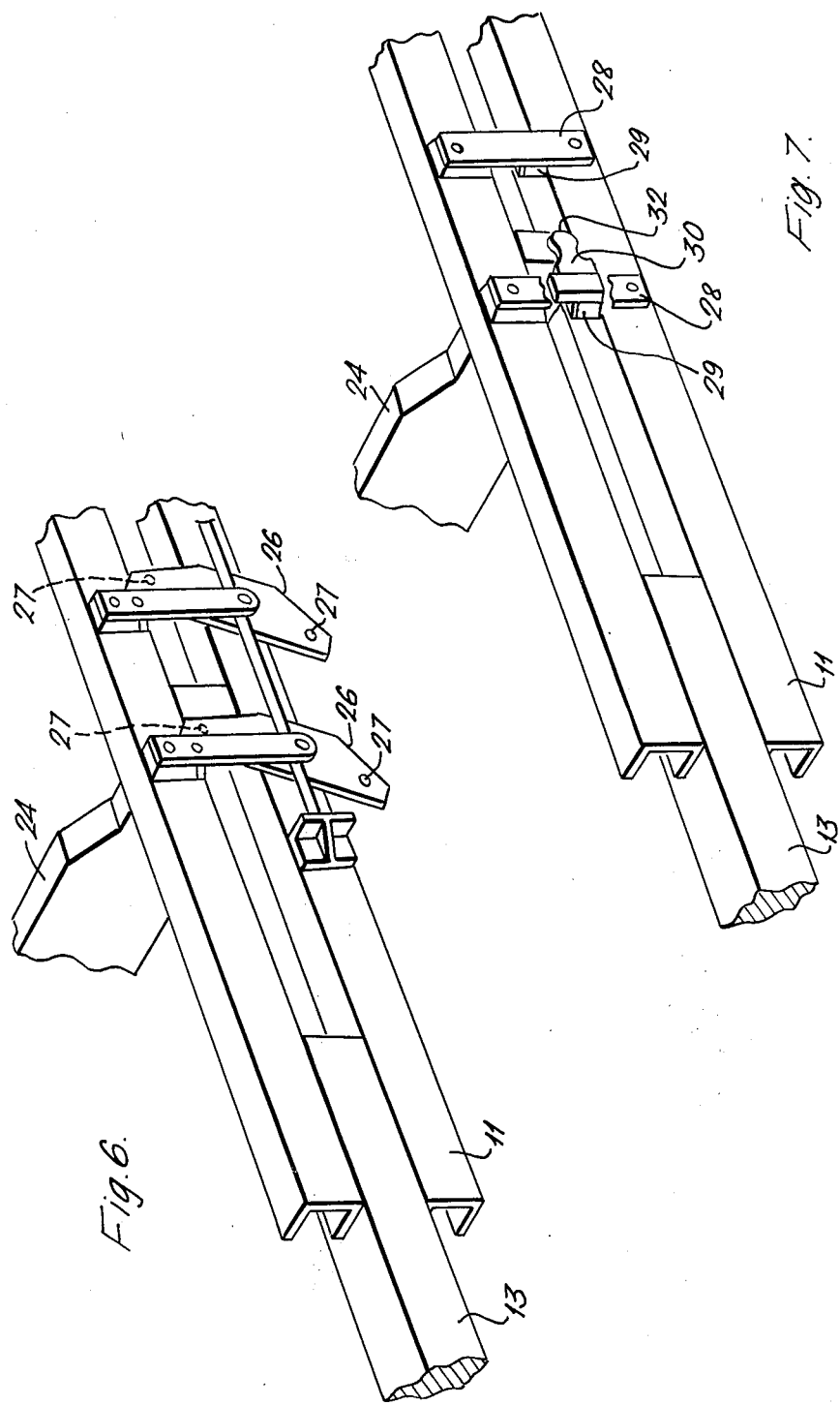

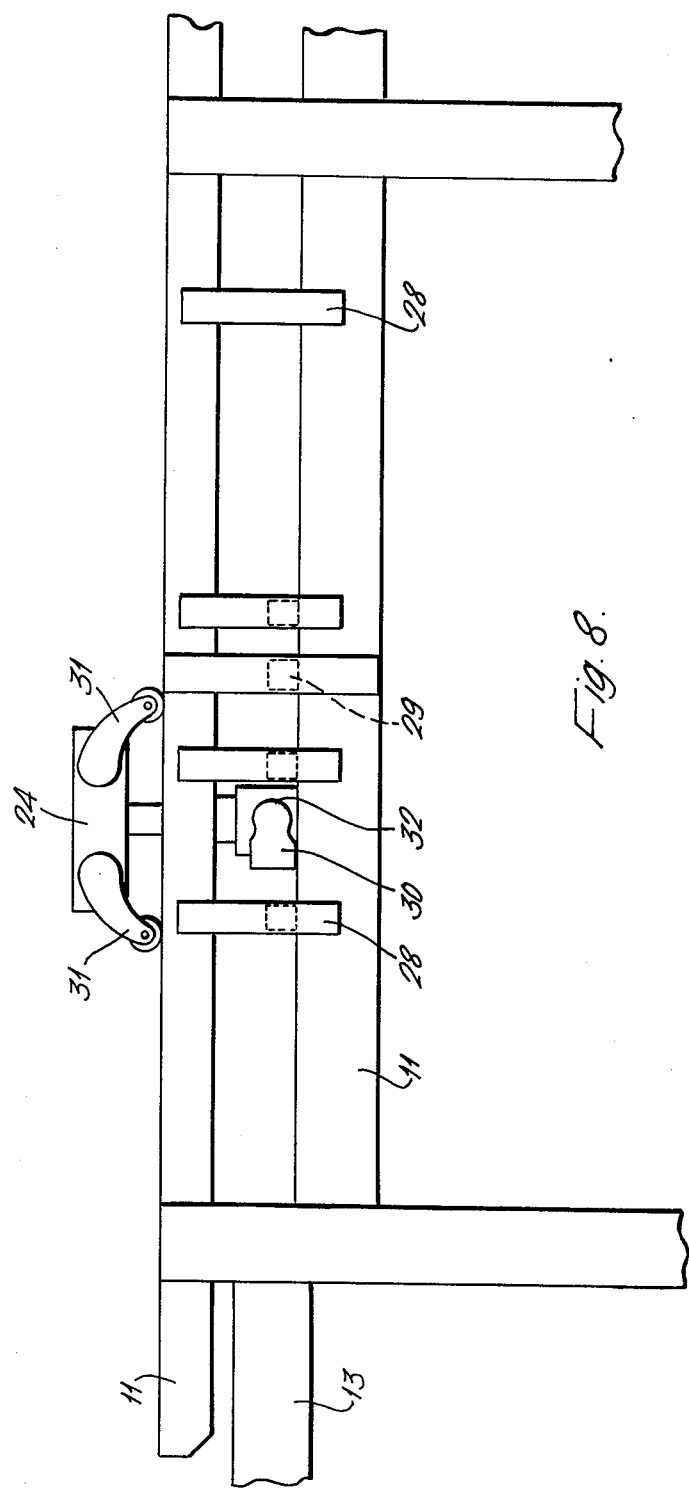

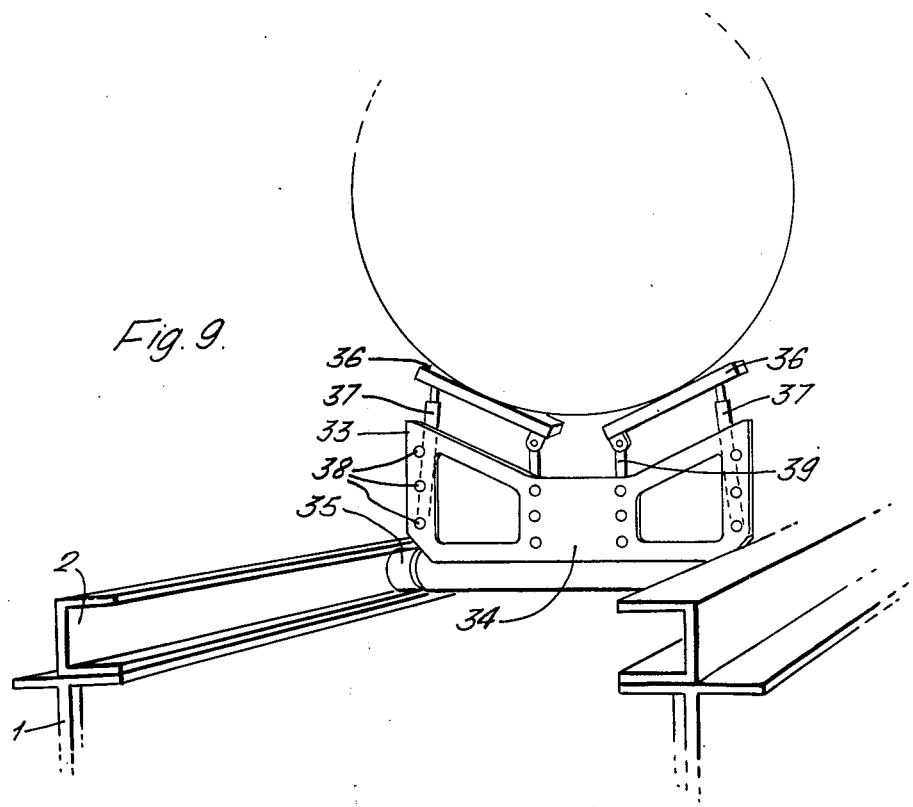

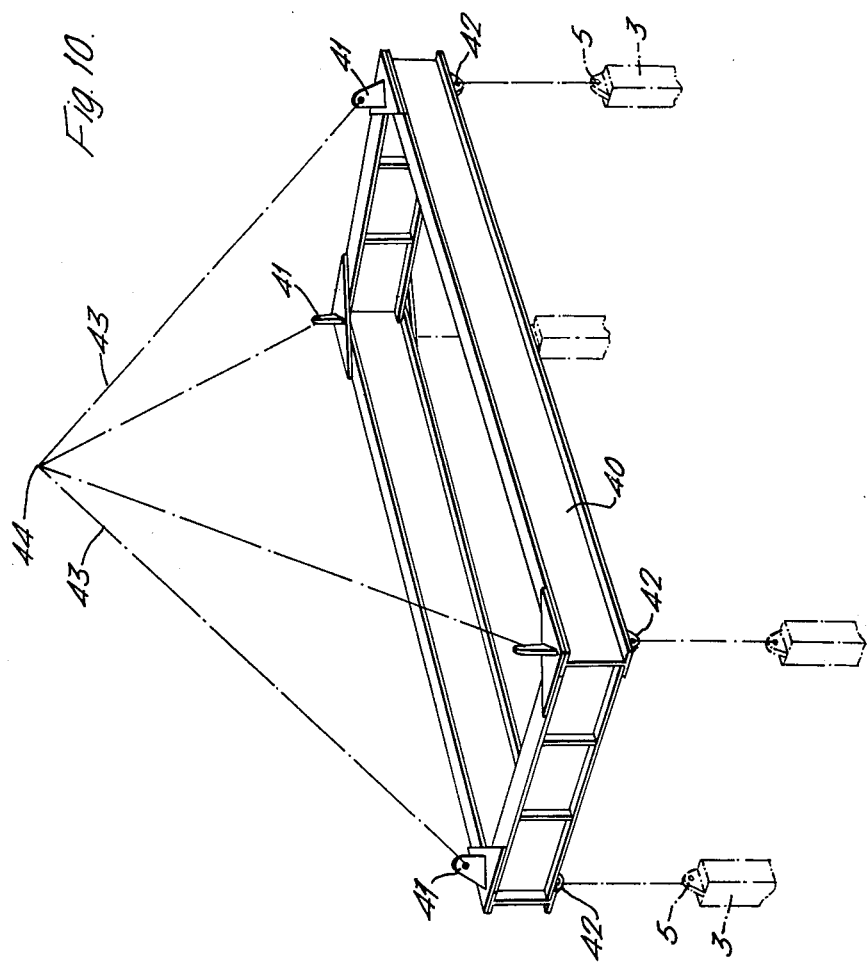

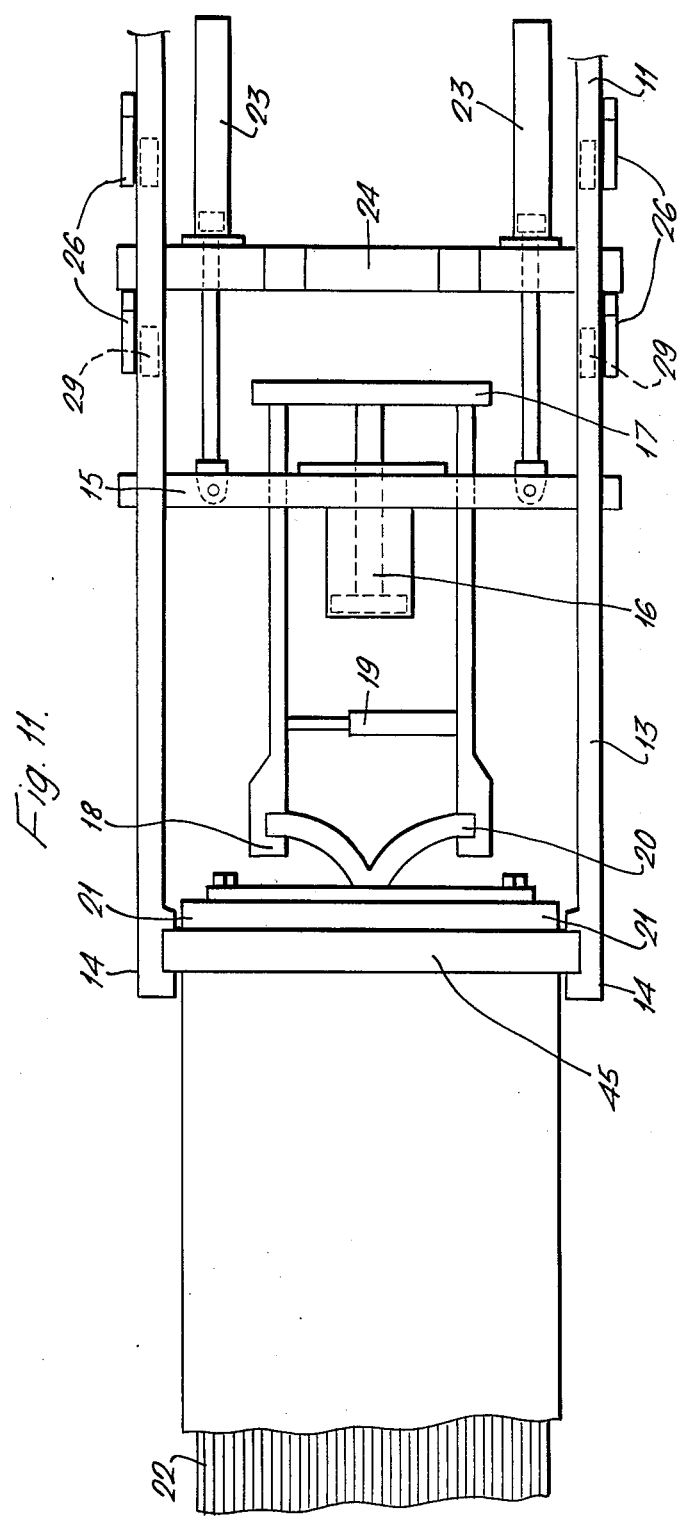

APPARATUS FOR REMOVING HEAT EXCHANGER TUBE BUNDLES

The present invention relates to an apparatus for moving a heat exchanger tube bundle out of or into the shell of a heat exchanger.

Heat exchangers are widely employed in chemical and oil processing plants and they are often very large in size, for example of the order of 24 feet long, up to 6 feet in diameter and weighing up to 20 tons or even more. Heat exchangers may be located at ground level or at elevations of as much as 50 to 100 feet above ground.

Heat exchangers are usually constructed with a horizontal cylindrical shell containing within it a tube bundle comprising many metal tubes. The tubes are supported within the shell by tube sheets or plates at one or both ends of the shell. Additional support is provided by baffles positioned at intervals along the length of the shell. The metal tubes are connected to receive a stream of process fluid and to exchange the heat from the stream with another stream of cooling or heating fluid flowing through the shell.

A heat exchanger may perform satisfactorily for long periods of time which may extend into years. Sooner or later, however, servicing by way of maintenance or repair will be necessary and the tube bundle will have to be removed from the shell. In some plants, it has been the practice to provide permanent auxiliary frameworks or scaffolding to facilitate withdrawal and servicing of the tube bundle. Such frameworks are costly to install and inevitably stand idle for long periods of time.

Prior art proposals for tube bundle extractors have included the use of rope and/or wire cables for pulling the tube bundle free of the shell of the heat exchanger. In such methods, the cables are inevitably subject to considerable strain and some danger is involved in the possible snapping of the cables under strain. Moreover, the use of rope or wire cables provides little opportunity to control the forces being used to withdraw the tube bundle.

According to the present invention, apparatus for moving a tube bundle out of or into a heat exchanger shell comprises an elongated frame structure including a pair of parallel spaced beams, a mobile carriage for supporting the tube bundle, said carriage being mounted on the parallel spaced beams for movement along the beams, means to connect and lock the elongated frame structure to the shell of the heat exchanger, a frame movable along the length of the elongated frame structure and carrying a force-exerting mechanism to exert a longitudinal force on the tube bundle to move the bundle into or out of the heat exchanger shell, and a plurality of lateral thrust surfaces spaced apart along the length of the elongated frame structure intermittently to afford locations along the length of traverse of the said mobile frame whereby to present opposing thrust surfaces to the thrust of the force-exerting mechanism and effect traverse, when the apparatus is in use, of the tube bundle along the elongated frame structure.

The thrust surfaces have a first mode of operation in which movement of the mobile frame, and hence the tube bundle, is allowed in a first direction along the axis of the apparatus but is resisted by the thrust surfaces in the reverse direction and a second mode of operation in which movement of the mobile frame in said reverse direction is allowed but is resisted in said first direction.

Preferred thrust surfaces comprise abutments or stops positioned laterally at intervals along the length of the elongated frame structure. An alternative form of thrust surfaces comprises a reversible ratchet system as hereinafter described in more detail.

Preferably, the force-exerting mechanism is hydraulically operated and comprises a main hydraulic cylinder, principally used to free the tube bundle from the heat exchanger shell, and at least one, and preferably two, less-powerful auxiliary hydraulic cylinders which are used to effect movement of the tube bundle once it has been freed from the heat exchanger shell.

It is preferred to construct and position the apparatus according to this invention so that, in use, non-symmetrical torque moments are avoided. To this end, the relative alignment of the force-exerting mechanism and of the clamping mechanisms used to connect the apparatus to the tube bundle and to the heat exchanger shell is such that bulk rotational movement of the apparatus of the invention, when in use, is minimised.

Embodiments of the invention will be described hereinafter with reference to the accompanying drawings in which FIGS. 4 to 9 are to a somewhat larger scale than FIGS. 1, 2 3 and 10.

FIG. 2 is a perspective view of the elongated frame structure of the extractor.

FIG. 3 is a perspective view of the main clamps for connecting the extractor to the shell of the heat exchanger.

FIG. 4 is a perspective view of the hydraulically operated force-exerting mechanism.

FIG. 5 is a plan view, partly in section showing the pulling arms connected to a pulling plate.

FIG. 6 is a perspective view of one form of stops used to control movement of the force-existing mechanism.

FIG. 7 is a perspective view, partly cut away, of an alternative form of stops used to control movement of the force-exerting mechanism.

FIG. 8 is a side elevation of the alternative form of stops shown in FIG. 7.

FIG. 9 is a perspective view of a mobile carriage used to support the tube bundle.

FIG. 10 is a perspective view in elevation of a lifting frame for lifting the extractor for use above ground level.

FIG. 11 is a plan view in schematic form of the force-exerting mechanism connected to the shell of the heat exchanger.

Figure 1:
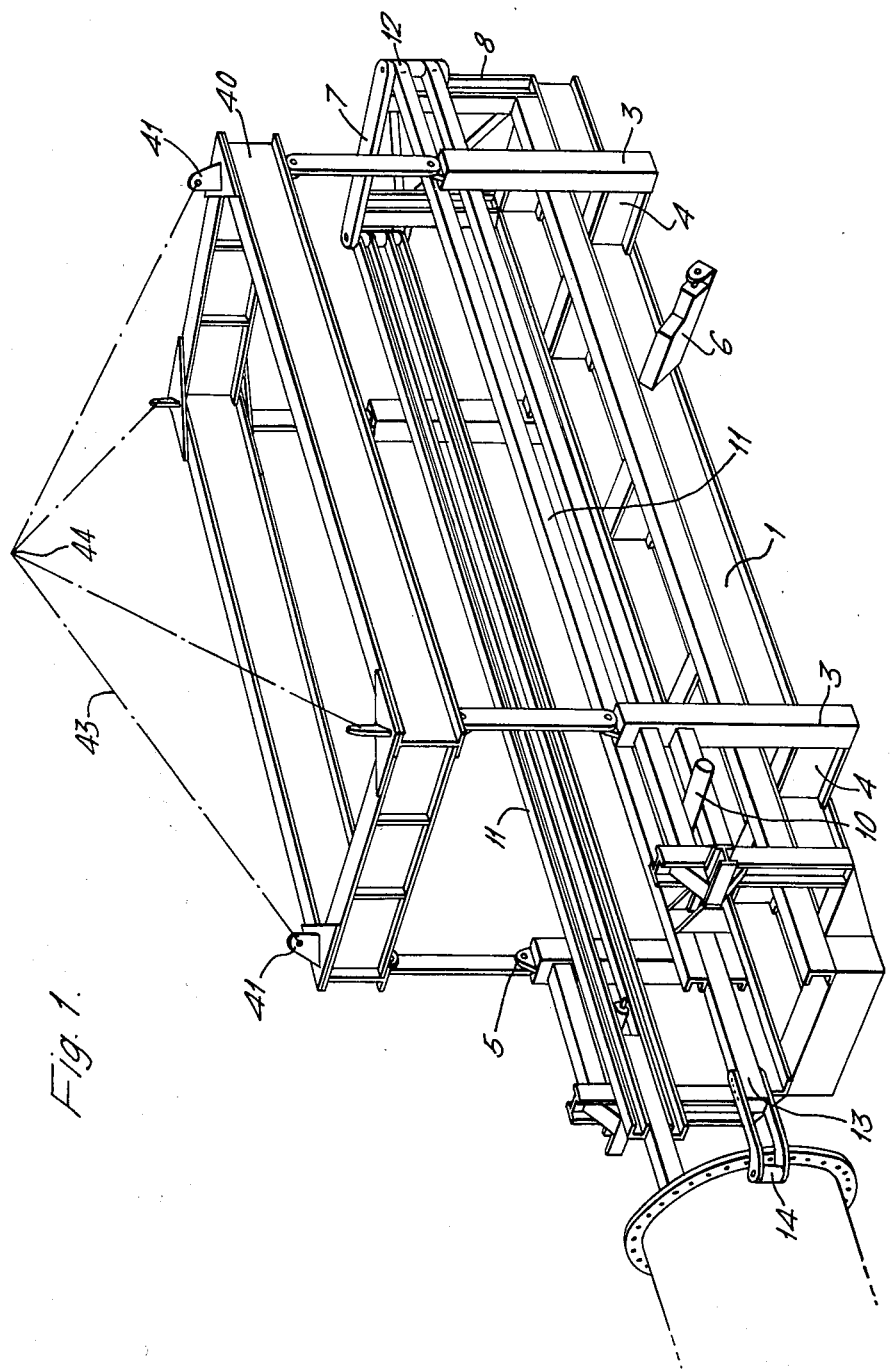
FIG. 1 is a perspective view in elevation of the general arrangement of a preferred embodiment of the invention in which, for clarity, some parts of the equipment viz the force-exerting mechanism, the tube bundle support trolley and certain pieces of apparatus, have not been shown.

In the description, the terms "inboard end" and "outboard end" mean respectively the end of the extractor which is nearer the heat exchanger and the end of the extractor which is further from the heat exchanger.

Referring now to FIGS. 1 and 2, a heat exchanger tube bundle extractor has a main structure which consists of two braced main beams 1 on top of which are welded channels 2 which form a track for bundle support trolleys 33 (described hereinafter). Four vertical struts 3 are attached to the main beams 1 by side members 4. The vertical struts 3 are provided at their upper ends with lifting eyes 5. In addition, each of the main beams 1 is provided at convenient intervals along its length with a number of further lifting eyes 6 (of which, for convenience, only one is shown in FIGS. 1 and 2). The provision of the lifting eyes 5 and 6 means that the structure can be readily balanced when it is lifted, no matter what the length of heat exchanger bundle being handled. At the outboard end of the main structure is a hinge support frame 7 consisting of two suitably braced vertical columns 8. At the inboard end of the main structure is a support frame 9 on which are mounted guide cylinders 10 for the main arms 11 (FIG. 3).

Referring to FIG. 3, the main structure contains a sub-frame within it which consists of two main arms 11, each constructed from a pair of channel beams, and having hinges 12 at the outboard end of the extractor. As shown in FIG. 1, the hinges 12 are supported in the support frame 7. The main arms 11 are fitted with connecting arms 13 and hydraulic clamps 14 at the inboard end. The position of main arms 11 is altered by operation of the guide cylinders 10 (FIG. 2).

Referring to FIGS. 4, 5 and 11, a fabricated sub-frame 15 is so made as to be slidable between the pair of channel beams which form the main arms 11 (See FIGS. 1 and 2). A main hydraulic cylinder 16 is mounted centrally on sub-frame 15. Extraction force exerted by cylinder 16 is transmitted via beam 17 to two pulling arms 18. Cylinder 16 is provided with an adjustable relief valve (not shown) so that the hydraulic pressure can be limited, if necessary. The arms 18, which are opened and shut using operating cylinder 19, are connectable to a pulling plate 20 which in use is bolted to the tube plate 21 of the tube bundle 22. Referring to FIG. 5, the pulling arms 18 are shown locked to the pulling plate 20 and ready for use. The rest position of arms 18 is indicated by the dotted lines in FIG. 5. Two smaller hydraulic cylinders 23 mounted on a crossbar 24 are also connected to the sub-frame 15. Each cylinder 23 is provided with an air-pilot operated directional control valve (not shown) to control the pressure. The operating controls for the valves are conveniently mounted on a pendant or control console.

FIG. 6 illustrates one form, and FIGS. 7 and 8 illustrate an alternative and preferred arrangement, of stops for the sub-frame 15.

During the initial extraction phase, the sub-frame 15 is in contact with the outboard ends 25 of the connecting arms 13 (see FIG. 3) which thereby act as a stop for sub-frame 15. Referring to FIG. 6, a series of pivoted stops 26 for the crossbar 24 is provided on each of the main arms 11. Each stop 26 (of which, for clarity, only two are shown) has a small weight 27 which can be fitted in either one of two positions (depending on whether a tube bundle is being withdrawn or replaced), thus creating a reversible ratchet system. (In FIG. 6, the alternative position for weight 27 is shown by dotted lines). After the crossbar 24 has passed a stop 26, the latter will swing back and provide a firm stop (thrust surface) for the next stage of tube bundle removal or replacement.

Referring to FIGS. 7 and 8, a series of connecting arms 28 is welded to each main arm 11 at intervals along its length. Corresponding series of chamfered stops (thrust surfaces) 29 are welded to main arms 11 immediately adjacent to and on the inner side of arms 28 (In FIG. 7, one arm 28 is shown partially cut away so as to illustrate a stop 29 more clearly). Supported in bearings mounted on each end of cross-bar 24 is a pivotable and reversible cam member 30 adapted to travel along the beam with the sub-frame 15. (Movement along the beam can be assisted by fitting rollers 31 to cross-bar 24—the rollers are omitted for clarity from FIGS. 4, 6 and 7, but are shown in FIG. 8). As the rounded end 32 of the cam member 30 reaches a stop 29, the cam member rides up over the chamfered edge of the stop. The opposite end of the cam member is designed to fit substantially flush against the stop 29. The cam member is reversible so that when the extractor unit reaches the limit of the structure in one direction, the cam member can be reversed so as to allow motion in the opposite mode.

Referring to FIG. 9, a series of support trolleys 33, of which only one is shown, is provided to support the tube bundle during withdrawal or replacement. Each trolley 33 has a rigid frame 34 supported on four wheels 35 and the trolley runs with the wheels 35 trapped in channel track 2 welded to the main beams 1. On its upper surface each trolley 33 has a pair of angled bundle support plates 36 each of which is supported by a single-acting cylinder hydraulic or screw jack 37. The provision of several positioning points 38 for the jacks 37 enables the angle of each support plate 36 to be varied so as to more adequately support tube bundles of a range of sizes. In addition, the height of the inner supports 39 for the plates 36 can be similarly varied to provide further adjustment and support.

FIG. 10 illustrates an auxiliary piece of equipment for use with the extractor when the latter is used to extract tube bundles positioned at a height above ground level. The lifting frame illustrated in FIG. 10 consists of a rigid, rectangular frame 40 provided with lifting eyes 41, 42 at each of its four upper and four lower corners. The four lower eyes 42 engage the lifting eyes 5 on the struts 3 of the main structure by means of high tensile steel bolts and nuts. The four upper eyes 41 are used to connect the ropes 43 of a rope sling to a crane hook at point 44.

Before using the extractor, the heat exchanger is prepared by removal of its channel box cover and channel box, dome end cover and floating head when fitted. The pulling plate 20 is then bolted to the bundle tube plate 21 (see FIG. 11).

The extractor itself is either suspended from a crane using an intermediate lifting frame (as illustrated in FIG. 10) or is supported from the ground or suitable elevated structure.

Power for the extractor is provided by an air motor (not shown) permanently attached to the extractor structure. A hosed air supply is coupled to the extractor in a conventional way and the relief valve on the main cylinder 16 is adjusted to the correct setting. This setting is so chosen that the hydraulic pressure (and hence the extraction force) is limited to a value which does not overstress the tube bundle, particularly during the initial stages of withdrawal when greater force is likely to be needed than later in the withdrawal operation.

The operation of the embodiment of the extractor which uses the bi-directional stops 26 (FIG. 6) will be described first. The series of bi-directional stops 26 are set to the appropriate operating mode using the weights 27. As a safety measure to prevent a short tube bundle being pulled too far, the appropriate outboard stop 26, that is the stop positioned at about the same distance from the tube plate 21 as the length of the tube bundle, is reversed. The main arms clamps 14 are kept in a relaxed position and the main arms 11 are opened fully by operation of the guide cylinders 10.

The extractor is then raised to the required elevation using a crane and lifting frame 40, and the main arms 11 are clamped with clamps 14 to the shell flange 45 (FIG. 11) on the exchanger centre line. Correct positioning of the clamps 14 relative to the shell flange 45 and to each other is of some importance if proper use is to be made of the pulling/pushing forces involved in the use of the extractor. To this end, it is convenient to provide the operator of the extractor with a guide to the correct positioning of the clamps. This guide can take the form of one or more gauges to indicate the angle at which the arms 13 and clamps 14 are positioned. More simply, colour charts across which needles move in response to the position of the arms 13 and clamps 14 can be provided on the extractor so that all the operator has to do is to ensure that each needle is in the appropriately coloured section of its chart. Alignment of the apparatus in this way ensures that best use is made of the forces involved and that unwanted torque moments are avoided. The clamps 14 and guide cylinders 10 are then locked in position. Using cylinder 19, the pulling arms 18 are opened from the rest position and then closed around the arms of the plate 20 (FIGS. 4, 5 and 11), thus connecting the sub-frame 15 to the pulling plate 20 and the bundle tube plate 21.

The final step in preparing the extractor for use is to ensure that the small hydraulic cylinders 23 are fully extended and that the sub-frame 15 is in contact at its inboard end with the stop formed by the outboard end 25 of the connecting arms 13.

Pulling force is now applied to the tube bundle plate 21 by operating the main hydraulic cylinder 16, care being taken, as hereinbefore mentioned, to ensure that the cylinder pressure does not exceed the predetermined safe limit. When the tube bundle has begun to move, the main hydraulic cylinder 16 is extended to its maximum travel. At that point, the small hydraulic cylinders 23 are retracted so as to continue extraction of the tube bundle until cylinders 23 are fully retracted. Cylinders 23 are then operated in the reverse direction, i.e. extended, until they have moved crossbar 24 beyond the next stop 26 (toward the outboard end of the extractor) and the stop has swung back into position. The sequence of operations involving retraction and then extension of cylinders 23 is repeated until the cross-bar 24 comes up against the outboard reversed stop 26.

Thus, in typical operations to withdraw a bundle, main cylinder 16 is used only in the initial freeing of the tube bundle from the heat exchanger. Withdrawal of the bundle is completed using the smaller hydraulic cylinders 23 which are used to exert a pushing force against the outboard side of stops 26 so that the corresponding reaction forces pull the sub-frame 15 and the tube bundle out of the heat exchanger.

When the cross-bar 24 has come up against the outboard reversed stop 26, the tube bundle is locked to the extractor by moving the sub-frame 15 past its nearest adjacent stop by continued retraction of cylinders 23, followed by extension of cylinders 23 so as to cause the sub-frame 15 to bear against the back (i.e. the outboard side) of the stop which it has just passed.

At the start of the operation to remove the tube bundle, the support trolleys 33 are parked at the inboard end of the channel track 2. When the bundle tube plate reaches the outermost trolley, the trolley jacks 37 and inner supports 39 are adjusted to provide support for the tube bundle. As more and more of the bundle is extracted, so more and more trolleys are brought into use to support it.

Operation of the embodiment of the invention which uses the welded stops 29 (FIGS. 7, 8,) is broadly similar to that using the bi-directional stops 26 (for convenience, the stops 29 are shown in dotted outline in FIG. 11). The extractor is connected and locked to the heat exchanger as hereinbefore described. The final step in preparing the extractor for use is to ensure that the small hydraulic cylinders are in an extended position such that the pivotal cam member 30 is correctly positioned relative to stops 29 to enable withdrawal of the tube bundle to take place i.e. the rounded end 32 of cam member 30 should be directed toward the outboard end of the extractor so that its other end can lie flush against the stops 29 and so that as crossbar 24 is moved toward the outboard end of the extractor, the rounded end 32 can ride up and over the chamfered edges of the welded stops 29.

Thereafter, the main cylinder 16 and smaller cylinders 23 are operated as hereinbefore described, the stops 29 performing the same function as the stops 26.

In the case where the heat exchanger is positioned at a height above the ground and the loaded extractor must be lowered using a crane, it is desirable to check whether the loaded extractor is balanced before lowering takes place. This can be done by partially releasing the shell flange hydraulic clamps 14 and observing whether the extractor tilts. Optionally, the extractor frame can be provided with a pendulum to indicate whether or not it is level. If it is necessary, the balance can be corrected by fine adjustment of the tube bundle using the main hydraulic cylinder 16. When the extractor has been balanced, the clamps 14 are released fully and the loaded extractor lowered to the ground using the lifting frame 40. The tube bundle is released from the extractor for cleaning and repair by disconnecting the lifting frame 40 and releasing the pulling arms 18.

The sequence of operations is reversed to replace a tube bundle within a heat exchanger. Referring to the embodiment of the invention in which the reversible ratchet system employing bi-directional stops 26 is used, the small weights 27 are re-positioned (see FIG. 6). In the embodiment in which welded stops 29 are used, the pivotable cam member 30 is reversed so that its rounded end is directed toward the inboard end of the extractor. During replacement of the bundle, crossbar 24 bears against the inboard side of the stops 26 or 29 as pushing force is applied to the bundle.

It is convenient also to incorporate other safety features into the design of the tube bundle extractor according to this invention. For example, the sub-frame 15 can be provided with a brake to prevent inadvertent movement of the frame and tube bundle. A convenient form of brake is a retractable tenon on the underside of the sub-frame which is adapted to engage appropriately positioned slots either in or under main beam 11. In addition, the controls of the extractor can be interlocked to prevent inadvertent or conflicting operations during use of the extractor, for example so that clamps cannot be freed from the exchanger shell unless the brake on the extractor has been applied.

The extractor according to this invention provides significant advantages over prior art extractors. The use of ropes and cables is avoided. The pulling/pushing forces are applied substantially symmetrically about the tube bundle centre line rather than, say, at the periphery of the tube bundle as has been the case in some earlier prior art extractors.

The wide use of hydraulic cylinders, for example to control the height and angle of the support plates on the trolleys 33 and to control operation of the clamps 14 and pulling arms 18, gives considerable flexibility and fine control in operation of the extractor. In addition, the step-wise withdrawal and replacement of the tube bundle provides an additional safety feature in that the extractor is prevented by the stops 26 and 29 from moving more than a relatively short distance at any one time, thus avoiding the danger of the extractor "running away" with the bundle. Nevertheless, extraction of a tube bundle is rapid. Extraction of a 24 ft, 20 ton tube bundle is accomplished in a total time of about 1 hour.

I claim:

1. Apparatus for moving a tube bundle out of or into a heat exchanger shell, comprising
    an elongated frame structure including a pair of parallel spaced beams;
    a mobile carriage, for supporting the tube bundle, mounted on said beams for movement therealong;
    means for connecting and locking said elongated frame structure to the shell of the heat exchanger;
    a frame movable along the length of said elongated frame structure including a cross-bar extending across said elongated frame structure between said beams, and said frame having means for interconnection to the tube bundle;
    means for exerting a force on said frame for moving said frame along said elongated frame structure toward and away from the heat exchanger shell, said means comprising: a single main linear force exerting structure; means for mounting said main linear force exerting structure to said frame so that by applying a linear pushing force away from the heat exchanger shell said frame, and the tube bundle connected thereto, will move away from the heat exchanger shell; a plurality of auxiliary force exerting structures; means for mounting each of said auxiliary force exerting structures directly to said means for mounting said main force exerting structure, and to said cross-bar, so that said auxiliary structures are directed opposite to said main structure; and
    a plurality of lateral thrust surfaces spaced apart along the length of said elongated frame structure to present opposing thrust surfaces to said auxiliary force exerting structures, and having a first mode of operation in which linear movement of said frame away from the heat exchanger shell is allowed, but movement toward the heat exchanger shell is prevented, and a second mode of operation in which linear movement of said frame toward the heat exchanger shell is allowed but movement away from the heat exchanger shell is prevented.

2. Apparatus as recited in claim 1 wherein said force exerting means consist essentially of said main linear force exerting structure and a pair of single acting auxiliary force exerting structures, one disposed on either side of said main structure.

3. Apparatus as recited in claim 2 wherein said force exerting structures comprise fluid piston and cylinder assemblies, and wherein said means for mounting said main linear force exerting structure comprises a sub-frame of said frame, movable along said frame structure and connected to said main structure cylinder, and wherein the piston of the main structure is connected to said means for interconnecting the frame to the tube bundle.

4. Apparatus as recited in claim 3 wherein said means for mounting each of said auxiliary force exerting structures to said means for mounting said main force exerting structure consists essentially of a direct connection between the end of the piston rod of each auxiliary structure and said sub-frame; and wherein said cylinder of each of said auxiliary structures is rigidly connected to said cross-bar.

5. Apparatus as recited in claim 1 wherein said lateral thrust surfaces comprise a series of thrust surfaces disposed along each of said parallel beams, and mounted for cooperation with said cross-bar.

6. Apparatus as recited in claim 5 wherein said cross-bar has a linear cam formed on each end thereof, each linear cam having one rounded end and one flat end, and mounted so that it is movable from a position wherein the rounded end faces away from the heat exchanger shell, to a position wherein the rounded end faces the heat exchanger shell; and wherein each said thrust surface comprises a chamfered stop rigidly attached to a said beam; the two different modes of operation of said thrust surfaces being provided by movement of each of said linear cams to the two different positions thereof.

7. Apparatus as recited in claim 5 wherein each of said lateral thrust surfaces comprises a stop pivotally mounted to a said beam for rotation about an axis parallel to said cross-bar, and means for receiving a weight formed in said stop on opposite sides of the pivot thereof; the two different modes of operation of said thrust surfaces being provided by inserting a weight in one of said means for receiving a weight in said stop while removing a weight from the other of said weight-receiving means in said stop, and vice-versa.

8. Apparatus as recited in claim 1 wherein said means for interconnecting said frame to the heat exchanger comprises a pulling plate directly securable to the heat exchanger; a pair of arms; means for mounting an end portion of each of said arms for pivotal movement of that end portion outwardly from an in-line position with the rest of said arm; a linear force exerting means mounted between said arm end portions for supplying a linear force for moving said arm end portions toward and away from each other to selectively grasp or release said pulling plate; and a beam connected between said arms at portions thereof opposite said pivoted end portions, said beam being connected to said frame through said main force exerting structure.

9. Apparatus for moving a tube bundle out of or into a heat exchanger, comprising
    an elongated frame structure including a pair of parallel spaced beams;
    a mobile carriage, for supporting the tube bundle, mounted on said beams for movement therealong;
    means for connecting and locking said elongated frame structure to the shell of the heat exchangers;
    a frame movable along the length of said elongated frame structure, including a cross-bar extending across said elongated frame structure between said beams, and said frame having means for interconnection to the tube bundle;
    means for exerting a force on said frame for moving said frame along said elongated frame structure toward and away from the heat exchanger shell, said means comprising at least one linear force exerting structure; and
    a plurality of lateral thrust surfaces along each of said parallel beams and mounted for cooperation with the ends of said cross-bar, to present opposing thrust surfaces to said at least one linear force exerting structure, and having a first mode of operation in which linear movement of said frame away from the heat exchanger shell is prevented, and a second mode of operation in which linear movement of said frame toward the heat exchanger shell is allowed but movement away from the heat exchanger shell is prevented; said cross-bar having a linear cam formed on each end thereof, each linear cam having one rounded end and one flat end, and mounted so that it is movable from a position wherein the rounded end faces away from the heat exchanger shell, to a position wherein the rounded end faces the heat exchanger shell; and wherein each said thrust surface comprises a chamfered stop rigidly attached to a said beam; the two different modes of operation of said thrust surfaces being provided by movement of each of said linear cams to the two different positions thereof.

10. Apparatus for moving a tube bundle out of or into a heat exchanger, comprising
an elongated frame structure including a pair of parallel spaced beams;
a mobile carriage, for supporting the tube bundle, mounted on said beams for movement therealong;
means for connecting and locking said elongated frame structure to the shell of the heat exchangers;
a frame movable along the length of said elongated frame structure, including a cross-bar extending across said elongated frame structure between said beams, and said frame having means for interconnection to the tube bundle;
means for exerting a force on said frame for moving said frame along said elongated frame structure toward and away from the heat exchanger shell, said means comprising at least one linear force exerting structure; and
a plurality of lateral thrust surfaces along each of said parallel beams and mounted for cooperation with the ends of said cross-bar, to present opposing thrust surfaces to said at least one linear force exerting structure, and having a first mode of operation in which linear movement of said frame away from the heat exchanger shell is allowed, but movement toward the heat exchanger shell is prevented, and a second mode of operation in which linear movement of said frame toward the heat exchanger shell is allowed but movement away from the heat exchanger shell is prevented; each of said lateral thrust surfaces comprising a stop pivotally mounted to a said beam for rotation about an axis parallel to said cross-bar, and means for receiving a weight formed in said stop on opposite sides of the pivot thereof; the two different modes of operation of said thrust surfaces being provided by inserting a weight in one of said means for receiving a weight in said stop while removing a weight from the other of said weight-receiving means in said stop, and vice-versa.

11. Apparatus as recited in claim 1 wherein said tube bundle is elongated and has a central axis, and wherein said means for mounting said mean linear force asserting structure comprises means for mounting said main linear force exerting structure so that the linear pushing force applied thereby is co-linear with the tube bundle axis.

* * * * *

UNITED STATES PATENT AND TRADEMARK OFFICE
CERTIFICATE OF CORRECTION

PATENT NO. : 4,227,854
DATED : October 14, 1980
INVENTOR(S) : Coffey

It is certified that error appears in the above—identified patent and that said Letters Patent is hereby corrected as shown below:

Column 9, line 5, between "is" and "prevented", insert -- allowed, but movement toward the heat exchanger shell is --.

Signed and Sealed this

Twelfth Day of October 1982

[SEAL]

Attest:

Attesting Officer

GERALD J. MOSSINGHOFF

Commissioner of Patents and Trademarks